US012662792B2

(12) United States Patent
Zock et al.

(10) Patent No.: US 12,662,792 B2
(45) Date of Patent: Jun. 23, 2026

(54) TUBULAR KNITTED GEOTEXTILES IMPLEMENTING NON-BIOMASS BASED INERT THREADS, METHODS OF MAKING THE SAME, AND EROSION SEDIMENT AND POLLUTION CONTROL PRODUCTS MADE FROM THE SAME

(71) Applicant: MKB Company, LLC, Westerville, OH (US)

(72) Inventors: Michael A. Zock, Saxonburg, PA (US); Jeffrey Karl Szebalskie, Mars, PA (US)

(73) Assignee: MKB COMPANY, LLC, Groveport, OH (US)

( * ) Notice: Subject to any disclaimer, the term of this patent is extended or adjusted under 35 U.S.C. 154(b) by 782 days.

(21) Appl. No.: 17/976,750

(22) Filed: Oct. 28, 2022

(65) Prior Publication Data
US 2023/0136157 A1     May 4, 2023

Related U.S. Application Data

(60) Provisional application No. 63/263,211, filed on Oct. 28, 2021.

(51) Int. Cl.
B01D 29/11        (2006.01)
B01D 39/08        (2006.01)
(Continued)

(52) U.S. Cl.
CPC .............. E02D 17/20 (2013.01); B01D 29/11 (2013.01); B01D 39/083 (2013.01); (Continued)

(58) Field of Classification Search
CPC .. C02F 1/001; C02F 1/40; C02F 1/286; C02F 1/04; C02F 1/0011; C02F 2301/001; C02F 2201/002; E03F 1/00; B32B 5/26; D04B 1/00; D04B 5/00; D04B 13/00; D04B 25/00; D04B 25/005; D04B 39/00; D04B 39/04; D04B 39/06; D03D 3/00; D03D 3/02; D03D 15/00; D03D 15/20; D03D 15/30; D03D 15/40; D03D 15/41; D03D 15/49; D03D 15/479; D03D 15/50; (Continued)

(56)          References Cited

U.S. PATENT DOCUMENTS 2,079,779 A     5/1937 Tullis
2,201,279 A     5/1940 Willing
(Continued)

FOREIGN PATENT DOCUMENTS

WO          WO-9010487 A1 *  9/1990  ............. B01D 29/11

*Primary Examiner* — Allison G Fitzsimmons
(74) *Attorney, Agent, or Firm* — Blynn L. Shideler; Krisanne Shideler; BLK Law Group

(57)          ABSTRACT

An erosion, sediment and pollution control product comprises a geotextile which includes at least 10% non-plastic non-biomass based inert threads, in particular basalt or glass threads, and cellulose based filler within the tubular geotextile. The geotextile may be knitted. A method of making a tubular knitted geotextile comprises the steps of: supplying non-plastic, non-biomass based inert threads, such as basalt or glass threads, to a circular knitting machine and knitting a tubular substrate which includes at least 10% non-plastic non-biomass based inert threads.

11 Claims, 3 Drawing Sheets

(51) Int. Cl.

| | |
|---|---|
| *D04B 1/16* | (2006.01) |
| *D04B 1/22* | (2006.01) |
| *E02D 17/20* | (2006.01) |

(52) U.S. Cl.

CPC ............. *B01D 39/086* (2013.01); *D04B 1/16* (2013.01); *D04B 1/22* (2013.01); *B01D 2239/0216* (2013.01); *B01D 2239/0609* (2013.01); *B01D 2239/0636* (2013.01); *B01D 2239/064* (2013.01); *B01D 2239/10* (2013.01); *B01D 2239/1233* (2013.01); *D10B 2101/06* (2013.01); *D10B 2101/08* (2013.01); *D10B 2201/01* (2013.01); *D10B 2201/24* (2013.01); *D10B 2505/04* (2013.01); *D10B 2505/204* (2013.01); *E02D 2200/13* (2013.01); *E02D 2200/1685* (2013.01); *E02D 2250/00* (2013.01); *E02D 2300/0085* (2013.01); *E02D 2300/0087* (2013.01)

(58) Field of Classification Search

CPC ........ D03D 15/60; D03D 15/62; D03D 49/00; E02B 11/00; E02B 11/005; E02B 3/04; E02B 3/108; E02B 3/122; E02B 3/123; B01D 24/001; B01D 2101/00; B01D 2221/12; B01D 1139/10; B01D 29/27; B09C 1/002

USPC ................................................. 210/163, 924
See application file for complete search history.

(56) References Cited

U.S. PATENT DOCUMENTS

| | | | |
|---|---|---|---|
| 3,957,098 | A | 5/1976 | Hepworth et al. |
| 4,044,525 | A | 8/1977 | Forsgren |
| 5,595,458 | A | 1/1997 | Grabhorn |
| 6,109,835 | A | 8/2000 | Grabhorn |
| 7,226,240 | B2 | 6/2007 | Tyler |
| 7,303,084 | B2 | 12/2007 | McPhillips |
| 7,422,682 | B2 | 9/2008 | McPhillips |
| 7,449,105 | B2 | 11/2008 | Hastings |
| 7,654,292 | B2 | 2/2010 | Sweningson |
| 8,100,604 | B1 * | 1/2012 | Flasher ................... E02B 11/00 |
| | | | 405/36 |
| 8,821,076 | B2 | 9/2014 | Tyler |
| 10,603,608 | B2 | 3/2020 | Zock et al. |
| 2003/0031511 | A1 * | 2/2003 | Tyler ...................... E02B 3/127 |
| | | | 405/15 |
| 2019/0344477 | A1 * | 11/2019 | Huffa ....................... D04B 1/22 |
| 2019/0388806 | A1 | 12/2019 | Zock et al. |

\* cited by examiner 34  37  35

Clarity Additive One or more of Zeolite, Kenaf Core Activated Carbon and Peat Derivative

HOPPER  42

MOTOR  44  46  48  30

TUBULAR KNITTED GEOTEXTILES IMPLEMENTING NON-BIOMASS BASED INERT THREADS, METHODS OF MAKING THE SAME, AND EROSION SEDIMENT AND POLLUTION CONTROL PRODUCTS MADE FROM THE SAME

RELATED APPLICATIONS

This application claims priority to U.S. Patent Application Ser. No. 63/263,211, filed Aug. 28, 2021 titled "Tubular Knitted Geotextiles Implementing Non-Biomass Based Inert Threads, Methods of Making the Same, and Erosion Sediment and Pollution Control Products Made from the Same" which is incorporated herein by reference.

BACKGROUND INFORMATION

1. Field of the Invention

The present invention relates to tubular knitted geotextiles implementing non-plastic, non-biomass based inert threads, such as e-glass or basalt threads, methods of making the same and erosion, sediment and pollution control products made therefrom, such as, but not limited to, filter socks.

2. Background Information

A filter sock (also called a compost filter sock, compost filter sleeve, silt sleeve, filter sock, compost filter tube, compost mesh sleeve, or similar terms) is a type of contained compost filter berm. A filter sock is a mesh tube or netting containment member or sleeve filled with mostly biodegradable cellulose based filler material, often called compost material, and that is conventionally placed perpendicular to sheet-flow runoff primarily to control erosion and retain sediment in disturbed areas. Filter socks are known to remove pollution from runoff as well. The phrase "filter sock" is used herein to be inclusive of a mesh type containment member, generally tubular, filled at least partially with cellulose based filler material in a filtering type matrix and includes straw waddles, switchgrass filled cock product, weighted sediment tubes, coir logs and road wattles.

The concept of a filter sock formed as a mesh tube filled with cellulose based filler goes at least as far back as the mid 1930's in U.S. Pat. Nos. 2,079,779 and 2,201,279, by Mr. Willing, which are incorporated herein by reference. These early teaching disclosed the use of brush or bundled weeds (also called straw) as the compost filter.

Improvements in filter socks are shown in, for example U.S. Pat. Nos. 3,957,098, 4,044,525, 5,595,458, 6,109,835 7,303,084, 7,226,240, 7,422,682, 7,449,105, 8,821,076, and 10,603,608. For a more detailed background on filter socks in general see U.S. Patent Publications 2016-0279541 and 2015-0047298, which are incorporated herein by reference.

Some of the people and associated entities doing work in the evolution, proliferation of the modern filter sock are John Engwer at FilterMitt, Kevin Lane at Lane ECS, Tom Truelsen at Soil Tek, Rod Tyler at Filtrexx, Keith and Kevin Weaver at Weaver Express, and Doug Cadwell at River Valley Organics. Today's filter sock is a modern-day version of the original patented devices of Mr. Willing.

Blower trucks have been used for mobile in-situ filling of filter socks. Blower trucks represent a considerable expense and are not applicable for all terrains. Additionally, a portable hopper and auger feeder design has been used for in-situ construction of filter socks. A conventional auger system is shown in U.S. Pat. No. 7,654,292, which is incorporated herein by reference. See also U.S. Patent Publication 2019-0388806 for a disclosure of a suitable auger system, which is incorporated herein by reference.

The reference to the cellulose based filler material within the containment sleeve of a filter sock as "compost material" has caused some confusion in the art, and the applicant has attempted to correct this in a number of patent filings to date. The phrase can be used to reference that the filler material has undergone a certain amount of composting prior to being placed in the mesh containment member or sleeve, or alternatively can be used to describe the biodegradable aspect of the material after it has entered the mesh containment member or sleeve. The industry often utilizes freshly chipped or ground wood products as "compost material" without any designated pre-filling composting time. The industry also utilizes biodegradable products that actually have undergone some composting prior to use as a filler in a filter sock. Due to this confusion the present application refrains from referencing filter socks as "compost filter socks" although they may conventionally be referenced as such.

A large variety of materials have been proposed for forming the containment member for cellulose filler material in erosion, sediment and pollution control products, like filter socks. Natural or cellulose based fiber nettings have been proposed including those formed of cotton and burlap (typically jute or hemp), however, in filter socks the plastic netting or mesh dominates the market because of the needed longevity as well as cost considerations.

This use of plastic for netting or mesh does have an environmental impact, for example the applicant (AKA MKB in the industry) is a leading manufacturer of filter socks with plastic netting sleeves and it has estimated that MKB utilized enough plastic netting to manufacture 50 million water bottles in 2020 alone.

Effective, efficient and inexpensive non-plastic mesh netting/containment members that yield adequate field time performance would substantially reduce this reliance on plastic and yield environmental benefits. The non-plastic natural fiber based netting/containment members proposed to date have proven insufficient for long term usage.

SUMMARY OF THE INVENTION

One aspect of this invention is directed to an erosion, sediment and pollution control product comprising a tubular geotextile which includes at least 15% non-plastic, non-biomass based inert threads, in particular e-glass or basalt based threads, and cellulose based filler within the tubular geotextile.

One aspect of the invention provides an erosion, sediment and pollution control product comprising a tubular geotextile including at least 15% non-plastic, non-biomass based inert threads, such as e-glass or basalt threads, wherein the tubular geotextile has openings therein with an effective average opening size of about ⅛ inch to about ½ inch; and a cellulose based filler within the tubular geotextile.

One aspect of the invention provides method of making a tubular knitted geotextile comprising the steps of supplying non-biomass based inert threads to a circular knitting machine, and knitting a tubular mesh substrate The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figures 1, 2, 3, 4:
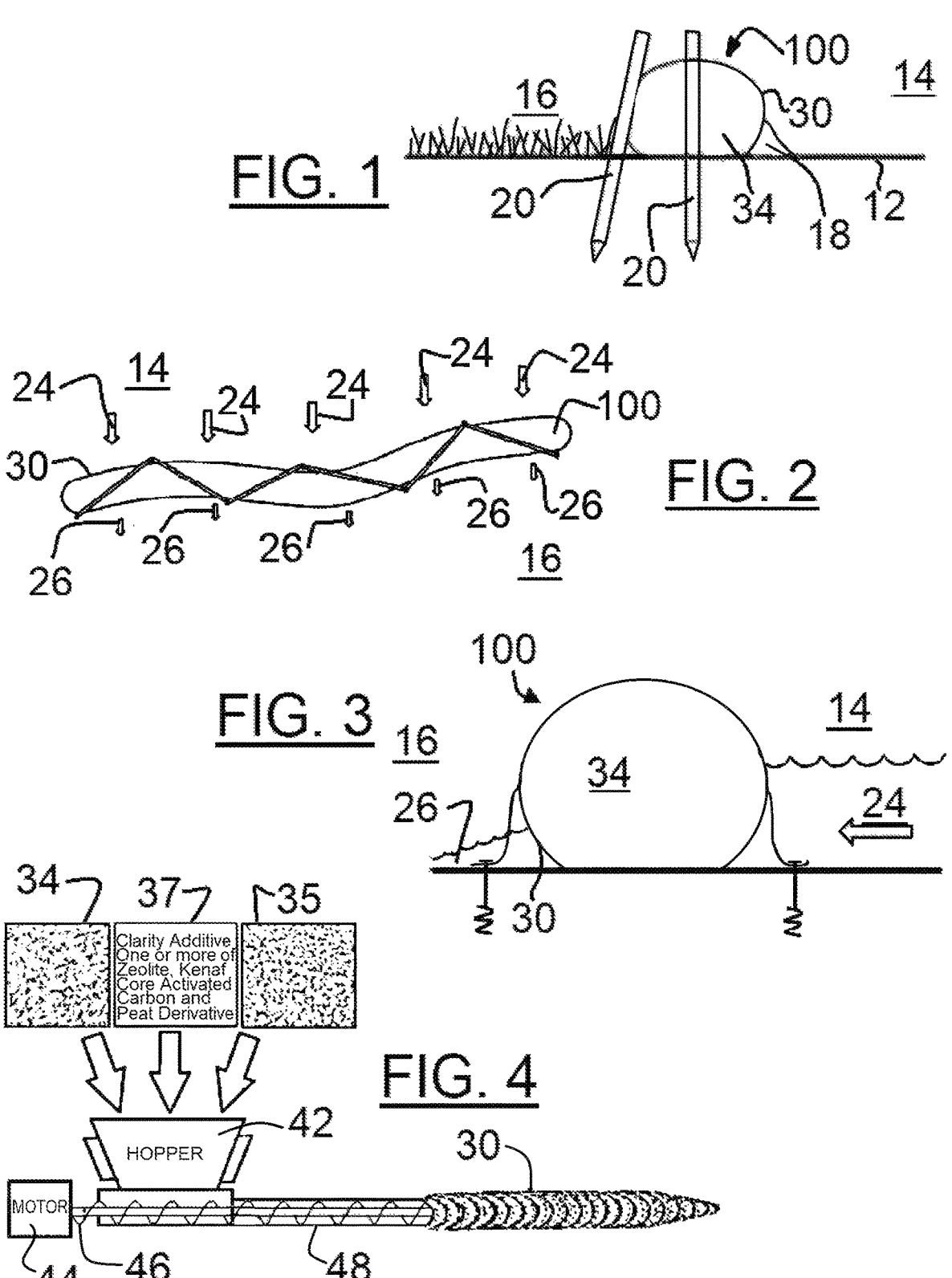
FIG. 1 is a schematic cross sectional illustration of an erosion, sediment and pollution control product including a tubular knitted geotextile implementing non-biomass based inert threads in accordance with one aspect of the present invention.
FIG. 2 is a schematic top plan view illustration of the erosion, sediment and pollution control product of FIG. 1 with an alternative anchoring system.
FIG. 3 is a cross sectional illustration of the erosion, sediment and pollution control product of FIG. 2.
FIG. 4 is a schematic illustration of an auger filling device for forming the of the erosion, sediment and pollution control product of FIGS. 1-3 according to the present invention.

The present invention relates to tubular knitted geotextiles 30 implementing non-plastic, non-biomass based inert threads 32, methods of making the tubular knitted geotextiles 30 and erosion, sediment and pollution control products made therefrom, such as, but not limited to, filter socks 100. The tubular knitted geotextile 30 is a geotextile which includes non-plastic, non-biomass based threads 32. The non-biomass based inert threads 32 within the meaning of this application include basalt threads; glass threads, particularly e-glass threads, and threads made from mineral wool.

Other known threads forming conventional filter socks are bio-based threads, such as hemp, cotton and even plastic (stemming from petroleum—a fossil fuel and hence a biomass derivative). The non-plastic, non-biomass based inert threads may also be accurately described as simply non-biomass based inert threads, however the more detailed description of "non-plastic, non-biomass based" is used to make it clear that plastic is excluded.

Specifically, the present invention is related to knitting textile tubes with openings therein, and having effective tube diameters from about 5 inches to about 32 inches, generally 5-24", with an effective average opening size of about ⅛ inch to about ½ inch. The term "about" defines +/−10% within this application unless otherwise identified. The effective average opening size is an area measurement for these tubular products and is defined by the diameter of a circle that yields the same area as the average opening in the tubular product 100. Similarly, the phrase "effective diameter" of the tubular products 100 is defined by the diameter of a circle that yields the same area as the cross-sectional area in the tubular product 100. The tubular products 100 will have a constant diameter along their lengths and are most often, and preferably, manufactured as circular in cross section (wherein the effective diameter will equal the actual diameter), however ovals and even D-shaped products have been proposed. The circular cross section represents a more cost-effective manufacturing for these products.

Although manufactured as circular, in use in the field, these circular cross sectioned products, namely socks 100, will actually assume a "D" or oval cross-sectional shape due to engagement with the ground and the effects of gravity.

FIG. 1 is a schematic illustration of an erosion, sediment and pollution control product, namely a filter sock 100, including a tubular knitted geotextile 30 implementing 100% non-plastic, non-biomass based inert threads 32 in accordance with one aspect of the present invention. FIG. 2 is a schematic top plan view illustration of the erosion, sediment and pollution control sock 100 of FIG. 1 with an alternative anchoring system using straps such as disclosed in U.S. Patent Publication 2019-0176059, which is incorporated herein by reference. FIG. 3 is a cross sectional illustration of the erosion, sediment and pollution control sock 100 of FIG. 2. The upstream side 14 is the side of water runoff or flow 26 whereas the downstream side (AKA undisturbed side) 16 is the side having filtered water flow 26.

There are several advantages the filter sock 100 has over traditional sediment control tools, such as a silt fence, including that i) installation does not require disturbing the soil surface (no trenching), which reduces erosion; ii) it is easily removed and/or moved, if required; iii) reduces the use of plastic over conventional filter socks; and iv) the operator likely will not need to specially dispose of any material following implementation. These advantages lead to cost savings, either through reduced labor or disposal costs and ecological advantages.

The filter sock 100 of the present invention does have regulatory concerns as do most new products in this field. The EPA, for example uses a description that "the filter sock shall be produced from a 5 mil thick continuous filament, woven into a tubular mesh netting material." The Georgia EPA only lists "Multi-filament Polypropylene" as a suitable filter sock material. Similar restrictive definitions and descriptions of suitable filter sock netting material are found in many state regulatory agencies. It is noted again that burlap, hemp and cotton have been accepted in many jurisdictions (and predate the use of polypropylene (PP) mesh) despite not being officially included in the some overly restrictive official material definitions.

However, it is clear that the 100% non-plastic non-biomass based inert thread-based filter sock material (threads 32) of the present sock 100 have not been contemplated in any regulatory jurisdiction, and thus the filter sock 100 has to achieve regulatory approval for this unconventional material. Regulatory agencies are, however, hyper sensitive to the need to minimize plastic and the filter sock 100 of the present invention is expected to achieve rapid regulatory approval as well as rapid commercial adoption.

The use of cellulose based filler or filter material 34 (often called compost, sometimes inaccurately, as noted above) provides additional benefits. The filler 34 retains a large volume of water, which helps prevent or reduce rill erosion and aids in establishing vegetation on the filter sock 100. The mix of particle sizes in the filter material 34 retains as much, or more, sediment than traditional perimeter controls, such as silt fences or hay bale barriers, while allowing a larger volume of clear water 26 to pass through. Silt fences can become clogged with sediment and form a dam that retains storm-water, rather than letting the filtered storm-water pass through. In addition to retaining sediment, cellulose based fillers 34 can retain pollutants such as heavy metals, nitrogen, phosphorus, oil and grease, fuels, herbicides, pesticides, and other potentially hazardous substances-improving the downstream 16 water quality. Nutrients and hydrocarbons adsorbed and/or trapped by the filter sock 100 can be naturally cycled and decomposed through bioremediation by microorganisms commonly found in the filler 34 matrix.

Filter socks 100 are applicable to construction sites or other disturbed areas 14 (also called upstream side) where storm-water runoff occurs as sheet flow. Common industry practice for such filter devices is that drainage areas do not exceed 0.25 acre per 100 feet of device length and flow does not exceed one cubic foot per second. Filter socks 100 can be used on steeper slopes with faster flows if they are spaced more closely, stacked beside and/or on top of each other, made in larger diameters, or used in combination with other storm-water controls, such as compost blankets.

Filter socks 100 offer a large degree of flexibility for various applications. A large number of qualitative studies have reported the effectiveness of conventional filter socks in removing "settleable" solids and total suspended solids from storm-water. These studies have consistently shown that conventional filter socks are generally more effective than traditional erosion and sediment control systems. Conventional filter socks are often used in conjunction with compost blankets to form a storm-water management system. Together, these two systems retain a very high volume of storm-water, sediment, and other pollutants. The filter sock 100 of the present invention retains all of the above advantages of conventional filter socks.

Once the filter sock 100 is filled with filler 34 and put in place, it should be anchored to the slope. One well established anchoring method is to drive stakes 20 through the sock 100 at regular intervals; alternatively, or in addition, stakes 20 can be placed on the downstream side 16 of the sock 100.

As an alternative, straps such as shown in FIGS. 2-3 can be used to anchor the sock 100 in place. The ends of the filter sock 100 may be directed upslope, to prevent storm-water from running around the end of the sock 100. The filter sock 100 may be vegetated by incorporating seed into the cellulose based filler 34 prior to placement in the filter sock 100. Since filter socks 100 do not have to be trenched into the ground 12, they can be installed on frozen ground or even on cement or other "inhospitable" surfaces.

FIG. 4 is a schematic illustration showing the manufacture of erosion, sediment and pollution control product in the form of a filter sock 100 comprising a cellular based filler material 34 in accordance with one aspect of the present invention. Specifically, FIG. 4 shows the use of a known hopper 42 fed mixing auger 46 powered by motor 44 for forming products 100. The cellulose-based filler 34 is conveyed to the hopper 42, such as by gravity or pneumatically.

Any known cellulose-based filler can be utilized, including mixes thereof in a blended arrangement which is discussed in, for example, U.S. Patent Publication 2019-03889806 which is incorporated herein by reference. Other non-cellulose based materials may selectively be added, such as, for a representative example, a clarity additive 37 or weighting material 35 (such as gravel), which material if present is conveyed to the hopper 42 via gravity or feeding belt or the like.

The hopper 42 may include devices to assist the feeding such as vibrators. The use of a gravity feed hopper 42 with vibration from vibrators are sufficient to preliminary mix the filler 34 with other constituents (e.g., the clarity additive 37 and/or the weighting material 35) for delivery to a conveying-mixing auger 46 driven by motor 44. The auger 46 will convey and mix the filler 34 and other constituents if present to form a blended generally homogeneous mixture before it is deposited within the tubular knitted geotextile 30 implementing basalt threads 32 to form the product or sock 100 of the invention.

A sleeve of the tubular knitted geotextile 30 is on the outlet tube 48 of the conveying-mixing auger 46 and a leading end of the tubular knitted geotextile 30 is pulled off of the outlet tube and sealed by a tying mechanism or closing mechanism. Simply knotting the end is typically sufficient for forming the seal or closure, but bands, clips, fastener may be used as well. When a sufficient length of material of tubular knitted geotextile 30 has been filled with the blended filler material 34 (+optional additives) and the product 100 of the invention is the desired length for the intended usage, then the proximal end will be sealed, generally in the same method as the leading closure. The tubular knitted geotextile 30 may be cut so that multiple products 100 may be formed from one sleeve of tubular knitted geotextile 30 or the sleeve may be sized to form the necessary length of a single product.

Where the tubular knitted geotextile 30 is cut to form multiple products or socks 100 from one sleeve of tubular knitted geotextile 30, the proximal end of one sleeve of tubular knitted geotextile 30 may be reached before the end of that desired length of the product 100 being formed, in which case the filling process is halted and a new sleeve of tubular knitted geotextile 30 is placed onto the outlet tube 48 by feeding the outlet tube 48 and the partially formed product 100 through the new sleeve of tubular knitted geotextile 30. The leading end of the tubular knitted geotextile 30 is overlapped with the trailing end of the prior sleeve while the trailing end is still on the outlet tube 48 and the overlapped portions are coupled together such as with a few zip-ties or the like. With the new sleeve of tubular knitted geotextile 30 thus positioned the process resumes.

The product or sock 100 is generally palletized for shipment, but could be made in the field. Palletizing the product 100 is simply coiling the product 100 on a shipping pallet, which may then be wrapped in a containment wrap for shipping. These containment wraps are often plastic, but alternative materials can be used, and would yield greener solutions for packaging and shipping. It is possible that some jurisdictions will ban or severely limit the use of plastics in the product AND in the shipping and packaging, and the present invention intends to be able to easily comply with any such forthcoming regulations.

The tubular knitted geotextile 30 is known as a tubular mesh or netting material and must have opening that are sufficient to contain filler material 34 (together with other additives that may be present). The geotextile 30 utilizes opening with a nominal size or effective opening of about ⅛-½", generally ⅛-⅜". A tubular knitted geotextile 30 is considered sufficient to contain the filler material 34 where less than 1% of the filler material 34 pass through the tubular knitted geotextile 30 of the product or sock 100 after 30 seconds of vigorous shaking of the filled product 100. Products 100 do not exhibit loss of filler 34 from tubular knitted geotextile 30 in the field where they pass this simple manual containment test.

The tubular knitted geotextile 30 preferably exhibits a fabric flow test of at least 100 Gallons per minute based upon the permittivity test results in the ASTM 4491 type C testing protocol (as this testing protocol exists as of Aug. 27, 2020). Permittivity is a laboratory-measured characteristic of the geotextile, expressing the flow capacity of the geotextile per unit of head. American Society for Testing and Materials (ASTM) D-4491, "Standard Test Methods for Water Permeability of Geotextiles by Permittivity" is the industry standard method for measuring geotextile permittivity, and this application is referencing the test as of Apr. 27, 2020. This standard test is an index test and measures water flow rate through a geotextile in an isolated condition. Once permittivity is known, the flow capacity of the geotextile can be calculated for given thickness of geotextile. The tubular knitted geotextile 30 preferably exhibits a fabric flow test of at least 100 gallons per minute, and more preferably 200-400 Gallons per minute based upon the permittivity test results in the ASTM 4491 type C testing protocol.

As noted above a preferred non-plastic non-biomass based inert thread 32 is either a basalt thread an e-glass thread. Suitable basalt threads and e-glass threads 32 are commercially available and are described as yarns that are suitable for sewing. The preferred basalt or e-glass thread 32 used in the present invention will have 20-800 filaments per thread and is typically is formed of about 200 filament/ thread to 400 filament/thread. Further the thread 32 used in the present invention uses filaments with diameters of about 3-40 microns, and typically uses filaments with diameters less than 20 microns (in about the 5-15 micron range), more preferably less than 10 microns, with 6-9 micron filament diameters being most preferred. This filament diameter range allows effective use in the knitting machine 60 for forming the tubular knitted geotextile 30 used in the erosion, sediment and pollution control product or sock 100 of FIGS. 1-3.

Basalt is a common extrusive volcanic rock which is generally is composed of the minerals: plagioclase, pyroxene, and olivine. An inert rock found worldwide, basalt is the generic term for solidified volcanic lava. Safe and abundant, basalt rock has long been known for its thermal properties, strength and durability. More specifically basalt is an aphanitic extrusive igneous rock formed from the rapid cooling of low-viscosity lava rich in magnesium and iron (mafic lava) exposed at or very near the surface of a rocky planet or moon. More than 90% of all volcanic rock on Earth is basalt. Basalt thread, AKA basalt fiber, is a material made from extremely fine fibers of basalt. It is similar to carbon fiber and fiberglass, having better physio mechanical properties than fiberglass, but being significantly cheaper than carbon fiber. It is commonly used as a fireproof textile in the aerospace and automotive industries and can also be used as a composite to produce a wide variety of products. Basalt fiber is made from a single material, crushed basalt, from a carefully chosen quarry source and unlike other materials such as glass fiber, essentially no materials are added. The basalt is simply washed and then melted. The manufacture of basalt fiber requires the melting of the quarried basalt rock. The molten rock is then extruded through small nozzles to produce continuous filaments of basalt fiber.

Further, threads 32 made from basalt and suitable for use in the machine 60 also exhibit characteristics that make them safe as they break down in use, namely broken or cut threads 32 of the textile 30 of the sock 100 will not form skin puncturing shards. The thread 32 made from basalt may include a light coating or surface treatment of mineral oil, lanolin, starches, or even PTFE to minimize breakage and damage or dangers associated therewith. Although PTFE is effective and used in extremely small amounts in this context, alternative more eco-friendly surface treatments are preferred.

The thread 32 made from basalt used in the present invention is a 15 to 150 TEX thread and typically is a 66 TEX (about 600 Denier) thread formed by two 33 TEX threads or plies twisted together with each ply being 9 micron diameter filaments and 200 filaments per ply, known as an S200 thread (wherein S200 designates the number of twists per meter). The plies of the preferred thread 32 may effectively be replaced with 6 micron diameter filaments and 300 filaments per ply without changing the TEX of each ply or of the thread 32, with the 6 micron filament diameters exhibiting better knitting characteristics. The 6 micron filament thread 32 would also have an S 300 or 300 twists of two plies per meter. TEX and Denier is a measurement of weight per unit length of the thread 32 (s200 defines the twists of each 33 TEX ply per unit length).

Regarding twisting in the threads 32 this actually applies to either a ply or thread 32. Twisting is preferred but a suitable thread 32 could possibly work without it. In the present invention it is believed that it is more important or beneficial to twist together the plies than to twist filaments within a ply. A preferred ply twisting is 300 turns/meter in a 2 ply thread 32, but this could be as little as 30. The thread 32 could include more than two plies as well.

In discussing some of the advantages of thread 32 made from basalt a comparison with polypropylene (PP) is helpful. Commercial PP thread as commonly found in knitted or woven filter socks, has about 0.93 density relative to water (e.g. density of Pp thread/density of water). This results in the degrading socks 100 to result in micro-plastics that "get into everything." The National Oceanic and Atmospheric Administration states "plastic is everywhere. A lot of it ends up in the ocean. Most plastics in the ocean break up into very small particles. These small plastic bits are called "microplastics." Other plastics are intentionally designed to be small. They're called microbeads and are used in many health and beauty products. They pass unchanged through waterways into the ocean. Aquatic life and birds can mistake microplastics for food. Research is being conducted. But there's still much we don't know. In 2015, the U.S. banned the use of microbeads. But microplastics are still a huge problem." The inert threads 32 formed from basalt have a density that is roughly three times that of water such that if the thread 32 made from basalt, or portions thereof, enter waterways it quickly settles to the bottom becoming surface based volcanic rock (essentially what it starts its commercial life as).

The 66 TEX thread 32 made from basalt used in the invention is about ½ the volume of a 600 Denier Pp thread (roughly same weight per unit length), but about 25% stronger (tensile strength). The flow rate with similar sized openings is slightly higher because of the smaller volume of the thread 32 relative to a similar weight per length PP thread (opening size in such devices are typically measured center to center of surrounding threads).

Figure 5:
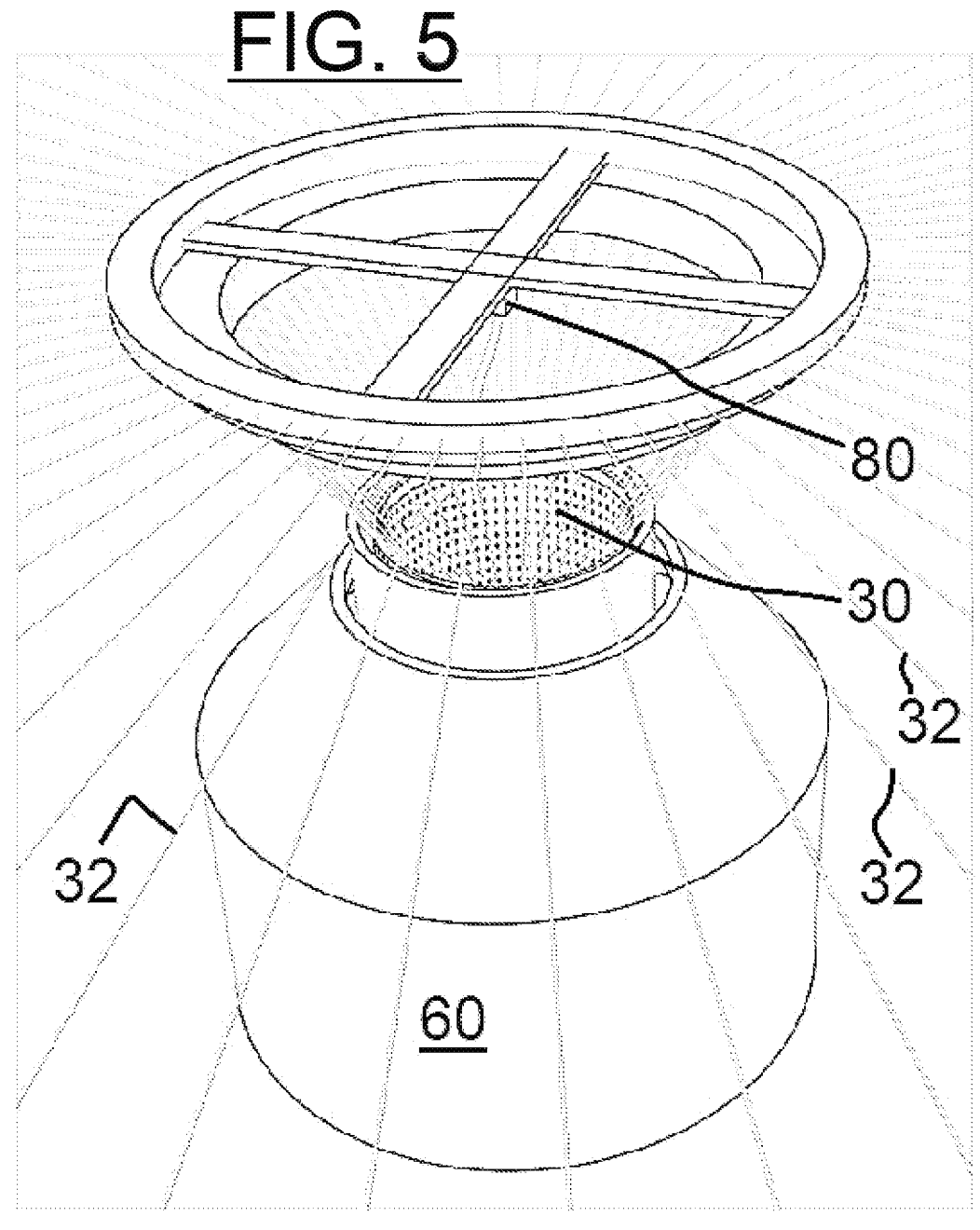
FIGS. 5-7 schematically illustrate a circular knitting machine forming the tubular knitted geotextile used in the erosion, sediment and pollution control product of FIGS. 1-3 in accordance with one aspect of the present invention.
Figure 6:
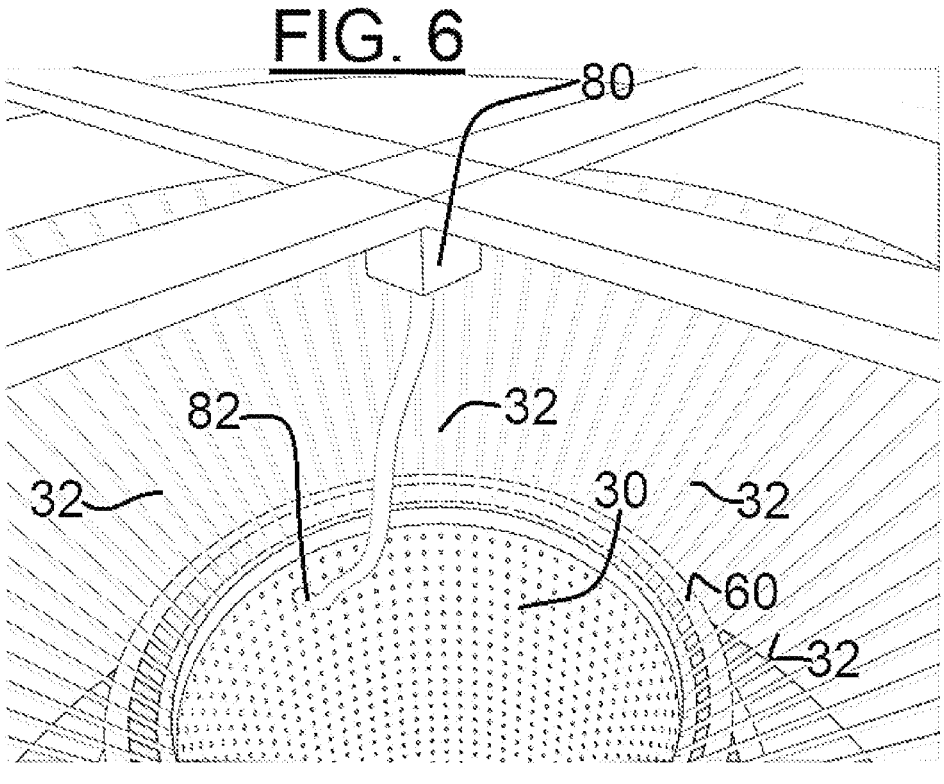
Figure 7:
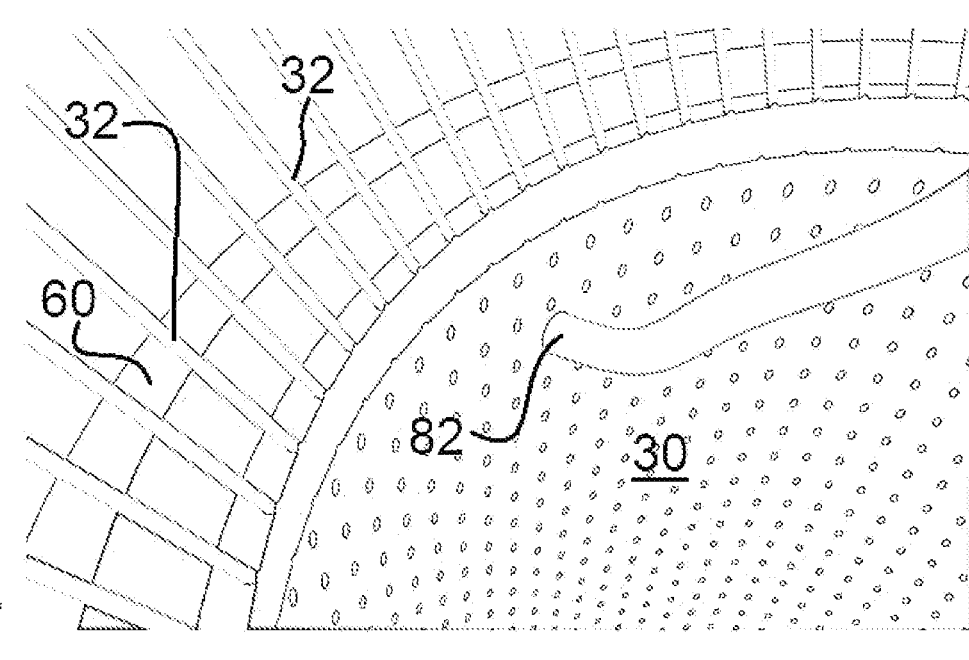

The non-plastic, non-biomass inert basalt threads 32 of the present invention are suitable for use in a circular knitting machine 60. FIGS. 5-7 schematically illustrate a circular knitting machine 60 forming the tubular knitted geotextile 30 used in the erosion, sediment and pollution control product or sock 100 of FIGS. 1-3. The circular knitting machine is generally known to those in the art and is not shown in detail. Circular knitting machines always produce a tube-shaped fabric, wherein the needles and sinkers in these machines are arranged in a circle. The threads 32 are fed to the machine which forms the tubular geotextile 30.

The machine 60 shown includes a unique spraying unit 80 with a spray nozzle 82 below the needles which can supply a surface treatment to the threads 32 if desired. The unit 80 shown was developed by the applicant to form hydrophobic cellulose based threads in a cellulose thread based geotextile, but in this application may selectively be used to supply a surface treatment to the geotextile 30 (or threads 32). A suitable spray unit is available from Unist, Inc.

A very light misting of mineral oil or lanolin or other enviro-safe lubricating coating (or PTFE) may be used as treatment on the surface of the textile 30 well below 2 oz. per square foot of geotextile 30, generally between about 0.01 and 1.0 oz. per square foot of geotextile. The purpose of this surface treatment is to facilitate the loading of the geotextile with material 34 when forming the sock 100 and to minimize breaking of the threads 32 and the danger posed by broken threads 32. The surface treated geotextile 30 will be easier to manipulate on the outlet tube 48 and be filled with filler 34. The surface treated geotextile 30 will also have better degradation characteristics in the field. Moving the sprayer nozzle 82 higher in the machine 60 and in a position to mist-coat all the incoming threads 32 could also be beneficial in having the treated threads 32 move through the machine 60. Other surface treatments can be considered and this is merely a representative example.

As noted above the thread 32 may be formed as glass threads, particularly e-glass threads, and threads made from mineral wool. The dimensional parameters of the e-glass threads will match those of the basalt threads discussed above. Each of a 66, 68, 108 and 125 TEX single ply E-glass thread 32 has been proposed as an effective alternative to the basalt thread 32. Alternatively, each of a 33, 34, 59 and 66 TEX double ply E-glass thread 32 has been proposed as an effective alternative to the basalt thread 32. Similarly, triple ply E-glass threads 32 with each ply having about ⅓ the TEX value of the single ply alternative would also be an effective alternative to the basalt thread 32.

Reinforced Natural Fiber Filter Sock 100

FIG. 1 is a schematic illustration of an erosion, sediment and pollution control product, namely a filter sock 100, including a tubular knitted geotextile 30 implementing 100% non-plastic, non-biomass based inert threads 32 in accordance with one aspect of the present invention. An alternative embodiment of the present invention is to use the non-plastic, non-biomass based inert threads 32 in a range of 10-30% (% is by thread count), generally 15-30% to reinforce conventional thread materials, preferably non-plastic natural fiber threads or cellulose based threads to form a tubular knitted geotextile 30. The filter sock 100 formed in this manner with greater than 50% natural fiber threads would be considered a reinforced natural fiber filter sock 100.

The reinforced natural fiber filter sock 100 is most preferably a non-plastic erosion control product (i.e., the threads are either the non-plastic, natural fiber threads or the non-plastic inert threads 32) yielding similar environmental benefits as the sock above formed from 100% non-plastic, non-biomass threads.

It is possible, but not preferred, that the geotextile 30 of the reinforced natural fiber filter sock 100 includes plastic threads (always at no greater than 40%)—such as for visibility enhancement, product marking, or other characteristics that are obtained from such threads. If the reinforced natural fiber filter sock 100 includes plastic threads they are present preferably in no more than 10% (most preferably at 0%). It is a goal of the present invention to minimize the use of plastic in products 100 and it is a further goal to actually eliminate such usage altogether.

The non-plastic natural fiber threads used in reinforced natural fiber filter sock 100 may be defined as natural and manmade cellulosic fibers. The natural cellulosic fibers include cotton, flax, hemp, jute, and ramie. The major manmade cellulosic fiber is rayon, a fiber produced by regeneration of dissolved forms of cellulose using generally either the vicose process (most common) or the lyocell process or the cuprammonium process. As a detailed example the lyocell process (which thread formed thereby is also called lyocell), consists of cellulose fiber made from dissolving pulp (bleached wood pulp) using dry jet-wet spinning. Lyocell was developed in 1972 by a team at the now defunct American Enka fibers facility at Enka, N.C. The U.S. Federal Trade Commission defines lyocell as a fiber "composed of cellulose precipitated from an organic solution in which no substitution of the hydroxyl groups takes place and no chemical intermediates are formed" and this definition is implemented herein. Lyocell threads that are treated to be hydrophobic represent a cost-effective choice of fiber for forming the tubular knitted geotextile 30 with preferably at least 15% reinforcing threads 32.

All of the above embodiments disclose a tubular geotextile including at least 10% non-plastic, non-biomass based inert threads, preferably at least 15% non-plastic, non-biomass based inert threads. The first embodiments of the invention are formed of 100% non-plastic, non-biomass based inert threads. The reinforced natural fiber filter sock embodiments of the invention further include at least 50% natural and manmade cellulosic fibers.

While the invention has been shown in several particular embodiments it should be clear that various modifications may be made to the present invention without departing from the spirit and scope thereof. The scope of the present invention is defined by the appended claims and equivalents thereto.

What is claimed is:

1. A tubular geotextile configured for forming an erosion, sediment and pollution control product including at least 10% non-plastic, non-biomass based inert threads, wherein the geotextile is knitted, wherein the tubular geotextile has an effective tube diameter from about 5 inches to about 32 inches, wherein the tubular geotextile has openings therein with an effective average opening size of about ⅛ inch to about ½ inch, wherein the non-biomass based inert threads include one of basalt threads and glass threads and wherein the basalt or glass threads uses filaments with diameters less than 20 microns and wherein the tubular geotextile forms the netting of a filter sock.

2. The geotextile according to claim 1 wherein the tubular geotextile includes at least 50% natural and manmade cellulosic fiber threads comprising at least one of cotton, flax, hemp, jute, lyocell and ramie.

3. The geotextile according to claim 1 wherein the non-biomass based inert threads is at least 15% of the geotextile.

4. The geotextile according to claim 2 wherein the non-biomass based inert threads include basalt threads.

5. The geotextile according to claim 3 wherein the tubular geotextile includes at least 50% natural cellulosic fiber threads comprising at least one of cotton, flax, hemp, jute, and ramie.

6. The geotextile according to claim 1 wherein the basalt or glass threads are each a 15 to 150 TEX thread.

7. The geotextile according to claim 5 wherein each basalt or glass thread is a multi-ply twisted thread.

8. The geotextile according to claim 6 wherein the tubular geotextile includes at least 50% natural cellulosic fiber threads comprising at least one of cotton, flax, hemp, jute, and ramie.

9. An erosion, sediment and pollution control filter sock product comprising:

A tubular geotextile including at least 15% non-biomass based inert threads wherein the tubular geotextile has openings therein with an effective average opening size of about ⅛ inch to about ½ inch, wherein the geotextile is knitted, wherein the tubular geotextile has an effective tube diameter from about 5 inches to about 32 inches, wherein the non-biomass based inert threads include one of basalt threads and glass threads and wherein the basalt or glass threads uses filaments with diameters less than 20 microns; and A cellulose based filler within the tubular geotextile.

10. The erosion, sediment and pollution control filter sock product according to claim 9 wherein the non-biomass based inert threads include one of basalt threads or glass threads.

11. The erosion, sediment and pollution control filter sock product according to claim 10 wherein the tubular geotextile includes at least 50% natural cellulosic fiber threads comprising cotton, flax, hemp, jute, and ramie.

\* \* \* \* \*